Figures 1, 6:
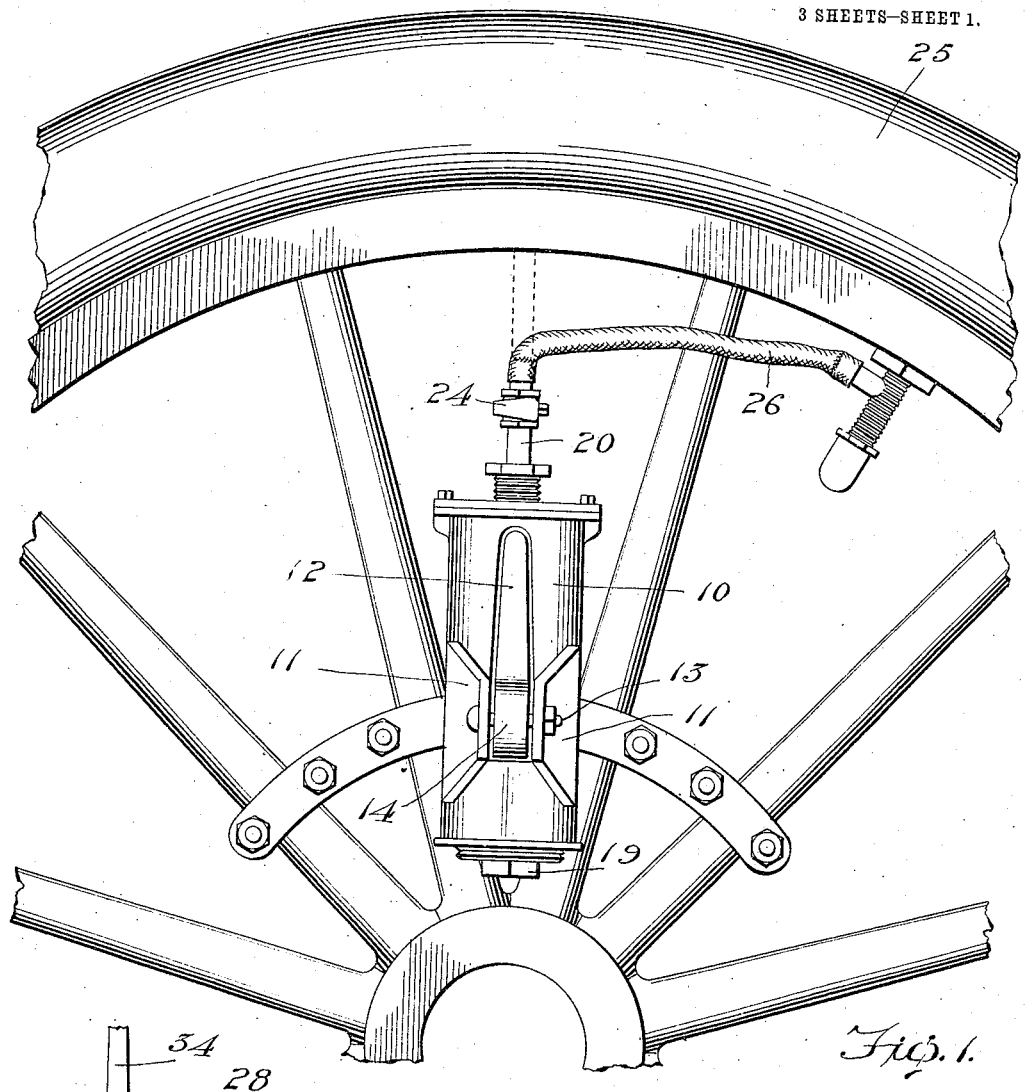

J. W. O'CONNOR.
EMERGENCY BRAKE.
APPLICATION FILED MAY 15, 1914.

1,122,532.

Patented Dec. 29, 1914.
3 SHEETS—SHEET 1.

Witnesses
Paul M. Hunt
Ross J. Woodward

Inventor
John W. O'Connor
By Richard B. Owen
Attorney

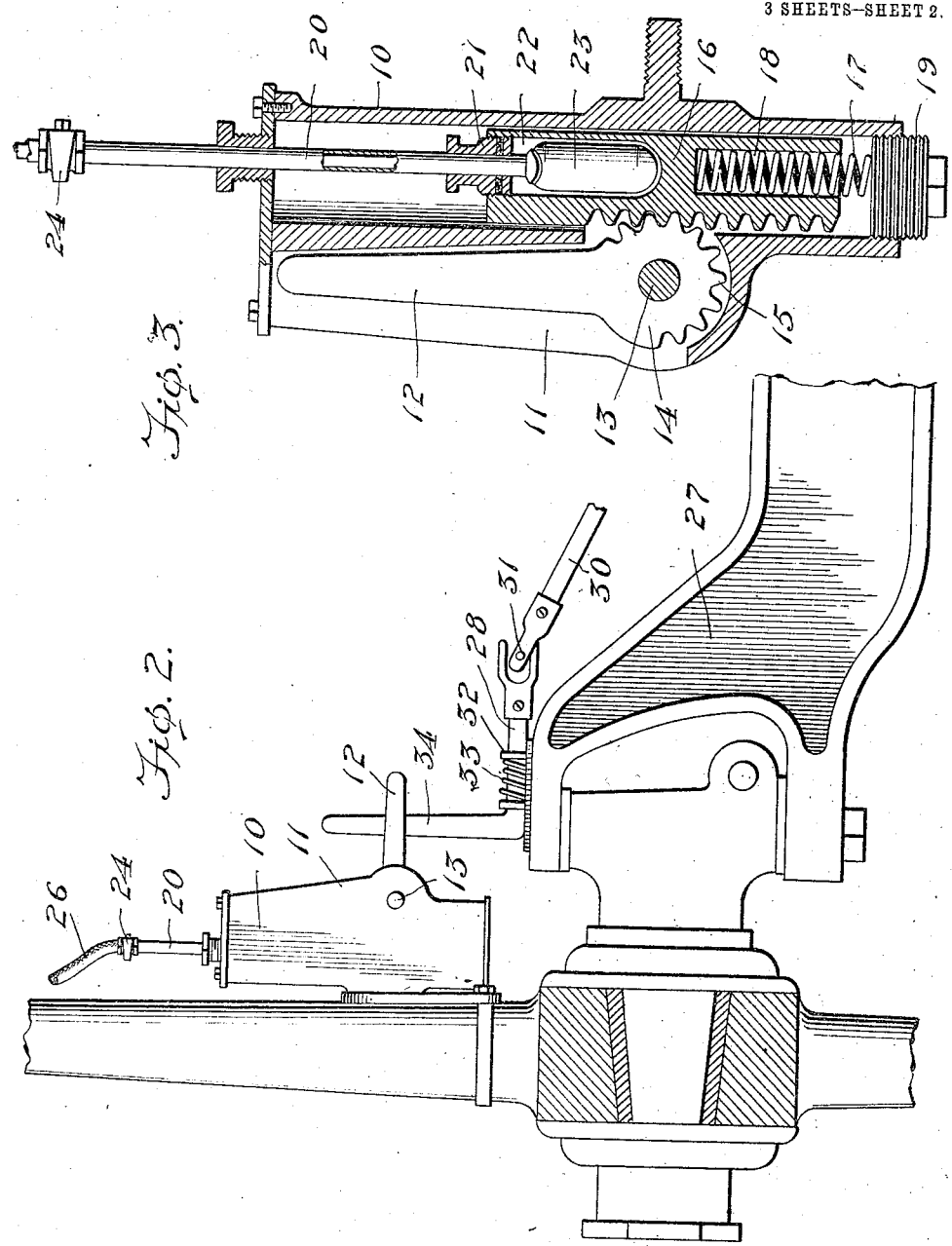

J. W. O'CONNOR.
EMERGENCY BRAKE.
APPLICATION FILED MAY 15, 1914.
1,122,532.
Patented Dec. 29, 1914.
3 SHEETS—SHEET 3.
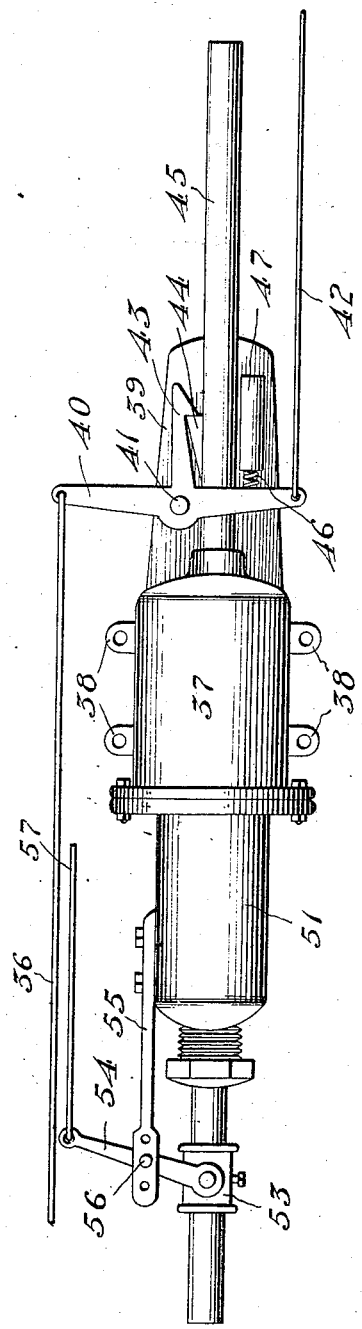
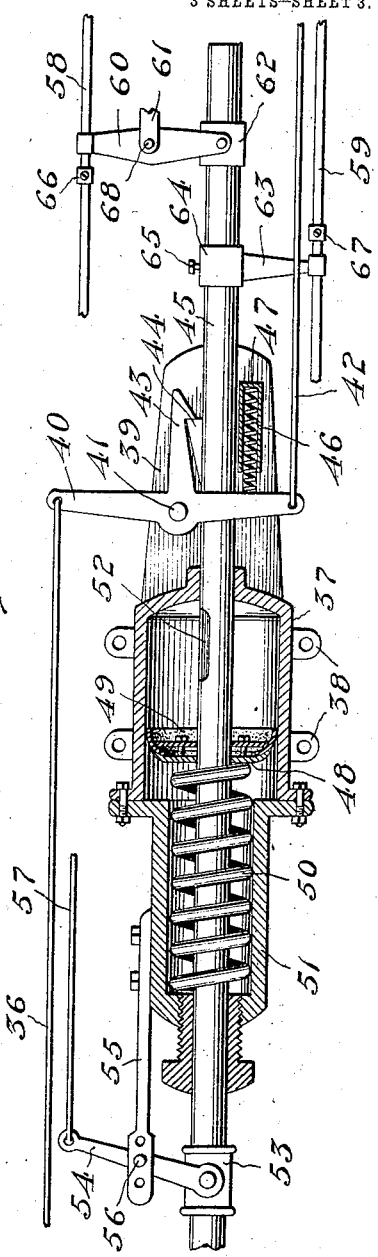
Witnesses
Paul M. Hunt
Ross J. Woodward
Inventor
John W. O'Connor
By Richard Owen
Attorney

UNITED STATES PATENT OFFICE.

JOHN W. O'CONNOR, OF ELMIRA, NEW YORK.

EMERGENCY-BRAKE.

1,122,532.   Specification of Letters Patent.   Patented Dec. 29, 1914.

Application filed May 15, 1914. Serial No. 838,813.

*To all whom it may concern:*

Be it known that I, JOHN W. O'CONNOR, a citizen of the United States, residing at Elmira, in the county of Chemung and State of New York, have invented certain new and useful Improvements in Emergency-Brakes, of which the following is a specification.

This invention relates to an emergency brake which is intended to be operated by a portion of the brake carried by the wheel of an automobile and normally held in an inoperative position by the air in the tire of the wheel. With this device the brake can be applied automatically if a blow-out or puncture occurs thereby preventing danger of accidents due to the automobile getting beyond the control of the operator. This device will also prevent danger of receiving rim cuts by running on a flat tire.

The principal object of the invention is to provide an emergency brake attachment which is so constructed that the brake will be set automatically but which will not interfere with the brake being operated by the usual foot lever.

Another object of the invention is to so construct the wheel portion of the device that it will be normally held in an inoperative position by the pressure of the air in the tire and to so construct it so that it will be moved to an operative position when the air pressure in the tire decreases beyond a certain amount.

Another object of the invention is to so construct the wheel attachment that it may be moved to an operative position when desired by turning a valve thus permitting the device to be set when the operator leaves the machine and preventing an unauthorized person from operating the machine.

Another object of the invention is to provide an improved cylinder forming part of the attachment and to provide improved means for releasably holding the rod passing through the cylinder in an inoperative position so that the brakes will be normally held released.

This invention is illustrated in the accompanying drawings, wherein—

Figure 1 is a view in elevation showing a fragment of a wheel and showing the wheel attachment connected thereto; Fig. 2 is a fragmentary view showing the wheel and axle in elevation and showing the wheel attachment connected with the wheel and in an operative position for engaging the lever of a flexible shaft carried by the axle; Fig. 3 is a vertical sectional view through the wheel attachment; Fig. 4 is a view in elevation of the brake cylinder forming part of this invention; Fig. 5 is a view of the brake cylinder shown partially in longitudinal section and partially in elevation; and Fig. 6 is a view in elevation of the flexible shaft carried by the axle.

When applying this device to an automobile a wheel attachment is applied to each of the wheels and a flexible shaft is applied to each end portion of each of the axles so that the emergency brake can be applied no matter which of the tires receives a puncture or blow-out. It is only necessary, however, to provide one brake cylinder which brake cylinder will be operated from whichever flexible shaft is moved to an operative position. The flexible shafts and wheel attachments are duplicates and therefore only one has been shown in the drawings.

The wheel attachment is provided with a cylindrical casing 10 from which there extends ears or leaves 11 between which the lever 12 is pivotally mounted by means of a pin 13 which passes through its head 14. This head 14 is provided with teeth 15 which mesh with the teeth of a plunger 16 slidably mounted in the casing 10 and normally held in an operative position by means of the spring 17. This spring 17 is seated in a pocket 18 formed in the plunger 16 and has its lower end bearing against a threaded plug 19 by means of which the tension of the spring 17 may be regulated. A tubular rod 20 is slidably mounted in the casing 10 and passes through the glands 21 into the pocket 22 formed in the plunger 16 and has its inner end connected with an air sack 23 preferably formed of rubber or similar material which will hold air. When the sack 23 is inflated the pressure of the air will hold the plunger in the position shown in Fig. 3 but when the pressure of the air is removed the spring 17 will move the plunger upwardly and swing the lever or trigger 12 to the position shown in Fig. 2 so that it can engage the flexible shaft which will be hereinafter described. This tubular rod 20 carries adjacent its outer end a three-way valve 24 which is normally left in a position so that air from the tire 25 can pass through the flexible tube 26 into the rod 20 into the air sack 23. It will thus be seen that if the tire 25 is punctured or receives a blow-out the air pressure will be released and the spring 17 will move the plunger 16 upwardly and swing the trigger 12 to the position shown in Fig. 2. If it is desired to release the air in the sack 23 without the air being released from the tires the three-way-valve 24 may be turned by a suitable key, thus permitting the air to escape from the sack 23 through the valve and thus permitting the plunger to move to a position to swing the trigger to an operative position.

Upon each end of the axle 27 there is provided a flexible shaft comprising the outer section 28, inner section 29 and intermediate section 30 connected with the inner and outer sections by means of the knuckle joints 31. The outer section 28 is rotatably connected with the axle by means of the bracket 32 and is normally held in the position shown in Fig. 2 by means of spring 33 so that its outer end which is formed into a lever 34 will extend in a position to be engaged by trigger 12 when moved to the operative position as shown in Fig. 2. The free end of the inner section is formed into a finger 35 which is connected with a line or wire 36 shown in Figs. 4 and 5. It will thus be seen that when the trigger 12 engages lever 34 it will move the lever against the tension of the spring 33 and rotate the flexible shaft so that the finger 35 will be moved to draw upon wire 36 and operate the brake cylinder.

The brake cylinder 37 is rigidly secured by means of bolts or other securing device passing through the ears 38 and is provided with an arm or extension 39 with which the lever 40 is pivotally connected by means of pin 41. This lever 40 has one end connected with the wire 36 and has the opposite end connected with the wire 42 which leads to a point where it may be easily reached by the operator of the automobile. It will thus be seen that when the lever is moved by the wire 36 or by wire 42 the catch 43 which is carried by lever 40 will be moved out of engagement with tooth 44 and thus release shaft 45. The lower portion of lever 40 is engaged by spring 46 mounted in the spring housing 47 and is thus normally held in a position to engage tooth 44 when the shaft is in the position shown in Figs. 4 and 5.

The shaft 45 is slidably mounted and extends through the cylinder 37 as shown in Fig. 5 and carries a piston head 48 provided with a cup 49 formed of leather or other suitable material. This piston 48 is engaged by one end of a spring 50 mounted in the neck 51 of cylinder 37 and compresses the air in the piston when tooth 44 is released from engagement by catch 43 so that the movement of the shaft 45 will be reduced and thus prevent the brakes from being set too suddenly. A cut out or groove 52 is provided in shaft 45 so that after the shaft has partially moved to a position to set the brakes the air in the cylinder will be released and the brakes permitted to be tightly set. Upon one end portion of the shaft 45 there is secured a collar 53 with which a lever 54 is pivotally connected, the lever 54 being fulcrumed to the bracket 55 by means of pin 56 so that when the wire 57 is drawn upon the lever 54 will be swung to draw the shaft 45 to a position in which catch 43 can engage tooth 44. The brake may be of any suitable type but must be of such a construction that it may be operated by either one of two rods such as shown at 58 and 59. The rod 58 sets the brake when the automatic device is operated and the rod 59 sets the brake when the brake is operated by the foot lever connected with wire 42. In order to move the rods 58 and 59 there is provided a lever 60 which is pivotally mounted by any suitable bracket such as indicated at 61 and pivotally connected with the collar 62 carried by shaft 45 and an arm 63 which has its sleeve 64 mounted on the shaft 45 and releasably held in an adjusted position by set screws 65. Collars 66 and 67 are carried by rods 58 and 59 and are engaged by lever 60 and arms 63 respectively when the brake is set. If a puncture is received or if the valve 24 is turned to an open position the air will pass out of the sack 23 and the plunger 16 will be moved to swing trigger 12 to the operative position shown in Fig. 2 thus causing the lever 34 to be moved to rotate the flexible shaft carried by the axle and swing the finger 35 to draw upon wire 36. This will move lever 40 to a position to raise catch 43 out of engagement with tooth 44 and thus release the shaft or rod 45 and permit the spring 50 to expand and move the shaft longitudinally. As the shaft moves longitudinally the lever 60 will be rocked upon its pin 68 and engage the collar 66 to move rod 58 longitudinally and set the brake. The brake can therefore be quickly set automatically in case a puncture is received or a blow-out occurs and the machine quickly brought to a standstill. It will also be noted that if the valve 24 is open the machine cannot be moved since the brake will be set by the trigger engaging lever 34 and therefore the automobile cannot be operated by unauthorized persons. After the puncture has been repaired or the valve 24 returned to its normal position the sack 23 will again be filled with air and plunger 16 returned to the position shown in Fig. 3, thus swinging trigger 12 to an inoperative position and releasing lever 34 so that the spring 33 can return the flexible shaft to its normal position and permit the spring 47 to move the lever 40 to its normal position so that the catch 43 will engage the tooth 44 when the shaft 45 is returned to its normal position.

In order to return the shaft 45 to its normal position it is simply necessary to draw upon wire or rod 57 thus swinging lever 54 and moving shaft 45 longitudinally in the direction of the lever 40. This will compress the spring 50 and move the shaft 45 to a position in which catch 43 can engage tooth 44. If the driver of the automobile sees some obstruction in the way or desires to quickly stop the automobile in order to prevent danger of a collision with a person or some other vehicle the wire 42 may be drawn by operating a suitable foot lever thus moving the lever 40 and raising the catch 43 to a position to release tooth 44 and permit shaft 45 to move longitudinally and bring arm 63 into engagement with collar 67 thus moving the rod 59 to set the emergency brake. It will of course be obvious that the brake may be operated by either rod 59 or 58, rod 58 being set by the automatic mechanism and rod 59 being usually operated by a foot treadle in the body portion of the automobile. Of course when the automatic mechanism is operated it will move rod 59 at the same time it moves the rod 58 but this will not interfere with the operation of the brake. It will thus be seen that the emergency brake can be operated either automatically or manually and thereby permit the operator of the automobile to stop the machine quickly and also permit the machine to be quickly brought to a stop in case of a blow-out or puncture thus preventing danger of the machine turning over and also preventing danger of the tire receiving a rim cut from running upon a flat tire.

What is claimed is:—

1. A brake operating system comprising a cylinder, a slidable shaft passing through said cylinder, a piston head carried by said shaft within said cylinder, resilient means yieldably holding said shaft in an operative position, a brake rod connected with said shaft, means for moving said shaft to an inoperative position, a pawl engaging said shaft to releasably hold the same in an inoperative position, and means for moving said pawl to release said shaft.

2. In a brake operating system a cylinder, a slidable shaft passing through said cylinder, a piston head carried by said shaft within said cylinder, a spring encircling said shaft within said cylinder and having one end engaging said piston head and the other end engaging said cylinder to yieldably hold said shaft in an operative position, a brake rod connected with said shaft and means for releasably holding said shaft in an inoperative position.

3. In a brake operating system a cylinder, a slidable shaft passing through said cylinder and provided with a piston head within said cylinder, means for yieldably holding said shaft in an operative position, a pawl pivotally connected with said cylinder and yieldably held in a position to engage said shaft and releasably hold said shaft in an inoperative position, a brake rod connected with said shaft, means for moving said pawl out of engagement with said shaft to permit said shaft to move to an operative position, and means for returning said shaft to an inoperative position and permitting said pawl to engage said shaft.

4. In a brake operating system a cylinder, a slidable shaft passing through said cylinder, yieldable means normally holding said shaft in an operative position, a tongue extending from said cylinder, a pawl pivotally connected with said tongue, resilient means normally holding said pawl in a position to engage said shaft when said shaft is moved to an inoperative position, means for moving said pawl to a position to release said shaft, means for returning said shaft to a position for engagement by said pawl, and a brake rod connected with said shaft.

5. In a brake operating device a cylinder provided with a neck constituting a spring housing, a slidable shaft passing through said cylinder and neck, a piston head carried by said shaft within said cylinder, a spring positioned in said neck and encircling said shaft and having one end engaging said piston head and the opposite end engaging the outer end of said neck to normally hold said shaft in an operative position, means for connecting said shaft with a brake, means for releasably holding said shaft in an inoperative position, and means for returning said shaft to an inoperative position after being released from said last mentioned means.

6. In a brake operating device a cylinder, a slidable shaft passing through said cylinder, means yieldably holding said shaft in an operative position, a bracket carried by said cylinder, a lever pivotally connected with said bracket and having one end pivotally connected with said shaft whereby said shaft may be moved to an inoperative position by rocking said lever, a tooth carried by said shaft, a pivotally mounted catch yieldably held in a position for engaging said tooth when said shaft is moved to an inoperative position and releasably holding the shaft in an inoperative position, and means for connecting said shaft with a brake to set the brake when said shaft is moved to an operative position.

7. In a brake operating device, a shaft, a brake rod, a pivotally mounted lever having one end pivotally connected with said shaft and the opposite end engaging said brake rod to move said brake rod to a set position when said shaft is moved to an operative position, resilient means yieldably holding said shaft in an operating position, pneumatic means for causing said shaft to gradually move to an operative position, means for releasably holding said shaft in an inoperative position, and means for returning said shaft to an inoperative position after moving to an operative position.

8. In a brake operating device, a cylinder, a slidable shaft passing through said cylinder, resilient means yieldably holding said shaft in an operative position, a pivotally mounted lever, a catch extending from said lever, means for yieldably holding said lever in a position for said catch to engage said shaft and releasably hold the same in an inoperative position, automatic means connected with one end of said lever for moving the same to a position to release said shaft, a brake rod, a pivotally mounted lever having one end pivotally connected with said shaft and the opposite end portion engaging said brake rod to move said brake rod to an operative position when said shaft is released from said catch, means connected with the opposite end portion of said first mentioned lever for manually moving the same to a position to release said shaft, a second brake rod, an arm carried by said shaft and engaging said second brake rod to move the same to an operative position when said shaft is released, and means for moving said shaft to an inoperative position.

9. In a brake operating mechanism, a brake setting mechanism including a shaft and cylinder, said cylinder being provided with means for normally holding said shaft in an operative position and with means for returning said shaft to an inoperative position and releasably holding said shaft in an inoperative position, a rotatable shaft, means for rotatably connecting said rotatable shaft with the axle of a vehicle and normally holding the same in an inoperative position, said shaft having one end portion provided with a finger connected with the means carried by said cylinder for releasably holding said first mentioned shaft in an inoperative position, the opposite end portion of said rotatable shaft being provided with a lever, and air controlled means adapted for connection with the wheel of a vehicle and including a trigger engaging the lever of said rotatable shaft when moved to an operative position for rotating said rotatable shaft and release said first mentioned shaft to permit the same to move to an operative position and cause the brakes of the vehicle to be set.

10. In a brake operating mechanism, a brake cylinder, a sliding shaft passing through said cylinder, said cylinder being provided with means for yieldably holding said sliding shaft in an operative position and for releasably holding the sliding shaft in an inoperative position, a rotatable shaft comprising an inner section, an outer section, an intermediate section, means connecting said sections for universal movement to form a flexible shaft, means for rotatably connecting the inner and outer sections with the axle of a vehicle, resilient means normally holding said flexible shaft in an inoperative position, a finger extending from said inner section, means connecting said finger with the means for releasably holding said sliding shaft in an inoperative position, a lever extending from said outer section, and air controlled means adapted for connection with the wheel of the vehicle and engaging said lever when in an operative position to turn said flexible shaft to an operative position and move the means releasably holding said sliding shaft in an inoperative position and permit said sliding shaft to move to an operative position.

11. In a brake operating mechanism a wheel device comprising a casing, means for connecting said casing with a wheel, a trigger pivotally connected with said casing and provided with a toothed head extending into the interior of said casing, a plunger slidably mounted in said casing and provided with rack teeth engaging the teeth of said trigger to move said trigger with said plunger, said plunger being provided with upper and lower pockets, a spring mounted in said lower pocket and engaging the lower end of said casing for normally holding said plunger in an operative position, a tubular rod slidably mounted in said casing and extending into the upper pocket of said plunger, an air sack positioned in said upper pocket and communicating with said tubular rod, and a conductor for connecting said tubular rod with an inflatable tire whereby air under pressure in said tire will pass into said air sack and hold said plunger in an operative position, said spring moving said plunger to an operative position when the air pressure is released and swinging said trigger to an operative position.

12. In a brake setting device, a casing, pivot ears carried by said casing adjacent an opening communicating with the interior of said casing, a plunger slidably mounted in said casing and provided with teeth forming a rack, resilient means for moving said plunger to an operative position, a trigger pivotally connected with said pivot ears and having its pivoted ends formed into a head provided with teeth engaging the rack of said plunger, the opposite end portion of said plunger from said resilient means being provided with a cut out forming a pocket, a tubular rod slidably mounted in said casing and extending into said pocket, an air sack carried by the inner end portion of said rod and engaging the inner end of said pocket, a gland carried by said rod and fitting tightly into the outer end of said pocket, a three-way-valve controlling the passage of air through said tubular rod, and a conduit for connecting said rod with an inflatable tire for permitting air under pressure in said tire to pass into said tubular rod and inflating said air sack, said valve being provided for permitting air to escape from said air sack through said rod without the air escaping from the tire through the conduit leading therefrom.

13. In a brake setting device, a casing, a trigger pivotally connected with said casing, and provided with a gear head, a plunger slidably mounted in said casing and provided with a rack engaging the gear head of said trigger, resilient means yieldably holding said plunger in a position to move said trigger to an operative position, and air controlled means for yieldably holding said plunger in a position to hold said trigger in an inoperative position against the tension of said resilient means.

14. In a brake operating mechanism, a casing, a trigger movably connected with said casing, means slidably mounted in said casing and engaging said trigger to move the trigger with said slidably mounted means, resilient means yieldably holding said slidably mounted means in a position to hold said trigger in an operative position, and air controlled means normally holding said slidably mounted means in a position to hold said trigger in an inoperative position.

15. In a brake setting mechanism, a casing, a trigger movably carried by said casing, means slidably mounted in said casing and connected with said trigger for causing said trigger to move with said slidably mounted means, resilient means in said casing engaging said slidably mounted means to move the same and move said trigger to an operative position, means for regulating the tension of said resilient means, and air controlled means engaging said plunger to move said plunger against the tension of said resilient means to a position to move said trigger to an inoperative position.

In testimony whereof I affix my signature in presence of two witnesses.

JOHN W. O'CONNOR.

Witnesses:
JOSEPH V. HALLERAN,
JOHN MARINAN.